United States Patent
Klausing et al.

(10) Patent No.: US 6,677,683 B2
(45) Date of Patent: Jan. 13, 2004

(54) SYSTEM FOR SUPPLYING POWER TO ROSAR TRANSPONDERS, INCLUDING TRANSMITTING AND RECEIVING ANTENNAS FOR ROSAR DEVICES

(75) Inventors: Helmut Klausing, Hochstadt (DE); Horst Kaltschmidt, Neubiberg (DE)

(73) Assignee: EADS Deutschland GmbH, Munich (DE)

(*) Notice: Subject to any disclaimer, the term of this patent is extended or adjusted under 35 U.S.C. 154(b) by 97 days.

(21) Appl. No.: 10/050,894

(22) Filed: Jan. 18, 2002

(65) Prior Publication Data

US 2002/0109356 A1 Aug. 15, 2002

(30) Foreign Application Priority Data

Jan. 18, 2001 (DE) .......................... 101 01 989

(51) Int. Cl.⁷ .............................................. H01L 41/00
(52) U.S. Cl. ............................ 290/1 R; 310/800; 322/8
(58) Field of Search ............................ 290/1 R; 322/8; 310/15, 340, 800

(56) References Cited

U.S. PATENT DOCUMENTS

| | | | | |
|---|---|---|---|---|
| 3,206,624 A | | 9/1965 | Cotter | 310/4 |
| 3,569,791 A | * | 3/1971 | Vogel | 361/143 |
| 4,504,761 A | * | 3/1985 | Triplett | 310/339 |
| 5,578,877 A | * | 11/1996 | Tiemann | 310/15 |
| 5,606,247 A | * | 2/1997 | Sutrina | 322/50 |
| 5,637,984 A | * | 6/1997 | Chu | 322/8 |
| 6,263,736 B1 | * | 7/2001 | Thundat et al. | 73/514.36 |
| 2002/0021058 A1 | * | 2/2002 | Duerr | 310/340 |

FOREIGN PATENT DOCUMENTS

| | | |
|---|---|---|
| DE | 3922086 | 10/1990 |
| DE | 4323511 | 1/1995 |
| EP | 1004895 | 5/2000 |

* cited by examiner

Primary Examiner—Nicholas Ponomarenko
(74) Attorney, Agent, or Firm—Crowell & Moring LLP

(57) ABSTRACT

In a system for supplying power to ROSAR transmitting and receiving antennas that are integrated into the tip of a helicopter rotor blade, wind energy is converted directly into electrical energy locally at the rotor blade tip.

5 Claims, 2 Drawing Sheets

SYSTEM FOR SUPPLYING POWER TO ROSAR TRANSPONDERS, INCLUDING TRANSMITTING AND RECEIVING ANTENNAS FOR ROSAR DEVICES

BACKGROUND AND SUMMARY OF THE INVENTION

This application claims the priority of German patent document 101 01 989.0, filed Jan. 18, 2001, the disclosure(s) of which is (are) expressly incorporated by reference herein.

The invention relates to a system for supplying power to ROSAR transponders, including transmitting and receiving antennas for ROSAR devices, which are integrated into the tip of a helicopter rotor blade.

German patent documents DE 39 22 086 and DE 43 23 511 disclose a ROSAR system which operates on-line in near real time, and can be used in mapping, obstacle warning, mine detection, and landing aids, as well as for target reconnaissance and tracking, and for missile guidance. This ROSAR device is used at pulse frequency or in FM-CW operation, and operates in the cm- or in the mm-wavelength range. The present invention is based on this state of the art.

A transmitting and a receiving antenna for radar signals disclosed in German patent document DE 39 22 086 is integrated into the tip of a helicopter rotor blade. While the wireless communication connection with the fuselage of the helicopter is state of the art, a wireless power supply for the ROSAR transmitting and receiving device attached near a blade tip has not as yet been provided.

In accordance with the current state of the art, an electronic transponder card, positioned near the tip of a helicopter rotor blade, must be supplied with power via conducting wires or a battery. If the supply is to be implemented via conducting wires, the power must be transmitted to the electronic card via a rotary coupling, which would transmit the power from the helicopter fuselage to the rotor head, and via a dual-wire connection positioned or fastened along the rotor blade into the electronic card that is to be supplied with the power.

In addition to obvious weight problems, a supply of battery power would involve continuous maintenance expenditures.

One object of the present invention is to provide a supply of power to a ROSAR transponder that is integrated into the tip of a helicopter rotor blade, by converting aerodynamic energy into electrical energy.

Another object of the invention is to minimize necessary maintenance costs, for such a device.

Still another object of the invention is to provide a power supply which poses weight and balance problems.

Finally, yet another object of the invention is to enable the power supply to be easily integrated into a flat, streamlined electronic transponder card.

These and other objects and advantages are achieved by the power supply arrangement according to the invention, in which a wireless ROSAR power supply is mounted onto the underside of a rotor blade, near the blade tip, and uses the existing wind energy to supply electrical power to the ROSAR transponder. This arrangement may be realized in the form of a mechanical, electrical, or magneto-hydrodynamic device.

Other objects, advantages and novel features of the present invention will become apparent from the following detailed description of the invention when considered in conjunction with the accompanying drawings.

DETAILED DESCRIPTION OF THE DRAWINGS

Figure 1:
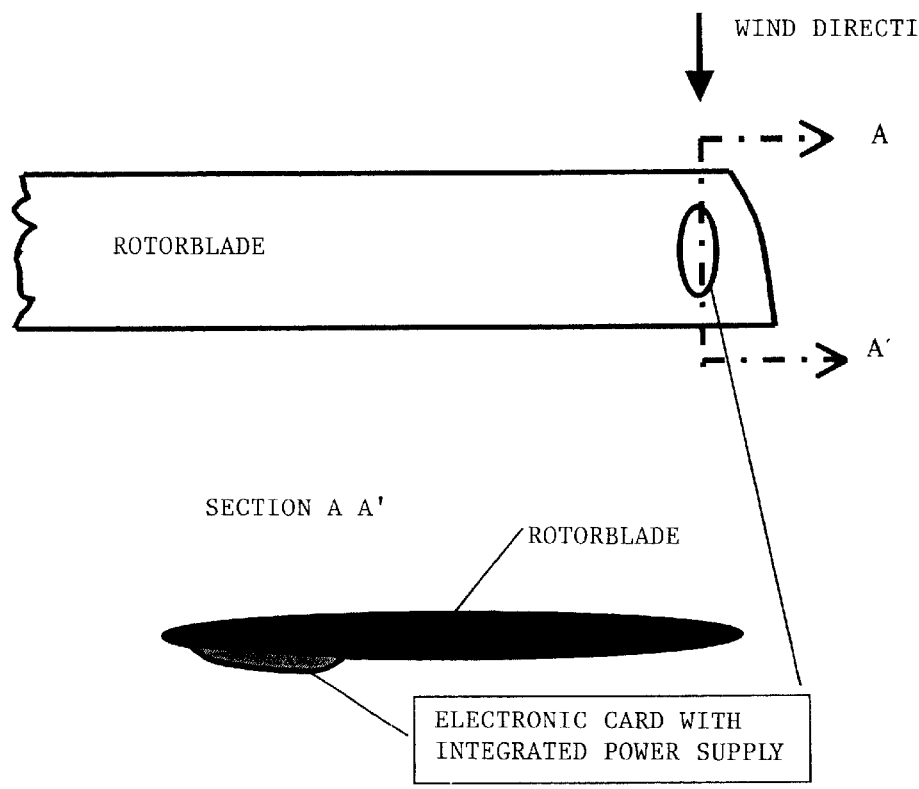
FIG. 1 is a schematic depiction of a rotor blade with an attached (glued) power supply card.

In the case of a mechanical power supply concept, its outer shape must be very flat and streamlined in order to prevent interference with air flow around the blade tip. Taking the possibility of aerodynamic degradation in flight performance and adequate electrical building space into account, its height should not exceed 10 millimeters. (See FIG. 1). A power supply of this type can be mounted via adhesive to the helicopter rotor blade, as part of a ROSAR retrofitting plan, or may be integrated into the rotor blade during the manufacturing process, for example via lamination.

Figure 2:
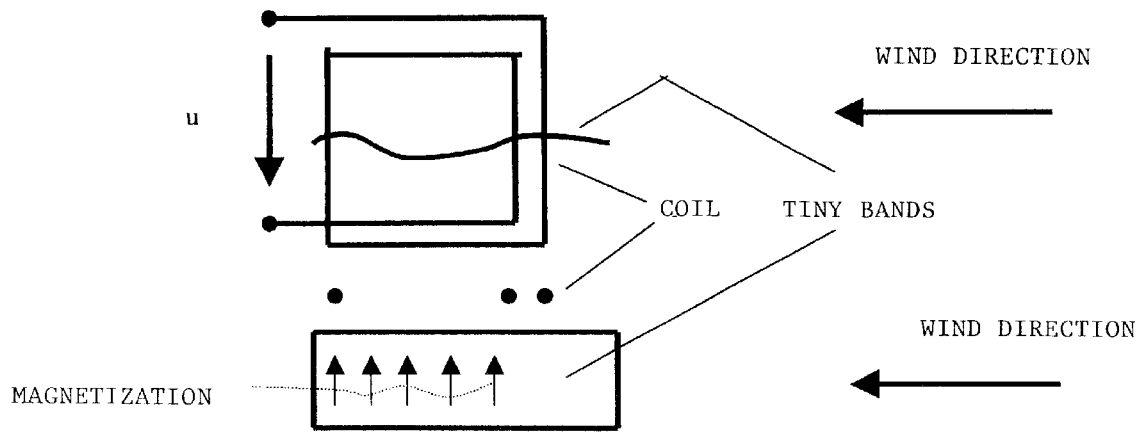
FIG. 2 is a schematic diagram of an exemplary aerodynamic-electromagnetic embodiment of the invention.

In an electrical embodiment of the power supply according to the invention, miniaturized turboelectric generators are oriented parallel to the wind direction; alternatively, bands that are allowed to flutter in the wind are used. The power supply card is divided into a plurality of small wind channels are also oriented parallel to the wind direction, and the conversion of the mechanically generated flutter energy into electrical energy is accomplished piezoelectrically or electrodynamically. For example, the tiny bands may be coated with a piezoelectric material, with the electrodes located at the beginning and the end of these tiny bands (FIG. 2).

In another electrodynamic embodiment of the invention, magnetic layers are applied to the above-mentioned tiny bands, and a flat coil with one or more turns is positioned laterally thereto, so that an alternating voltage is induced via the movement of the magnetic layers of the tiny bands. A number of these elements are connected in series or parallel to one another, and all elements of these embodiments (coils, channels, and tiny bands) are produced via manufacturing methods that employ conventional microsystems technology.

Figure 3:
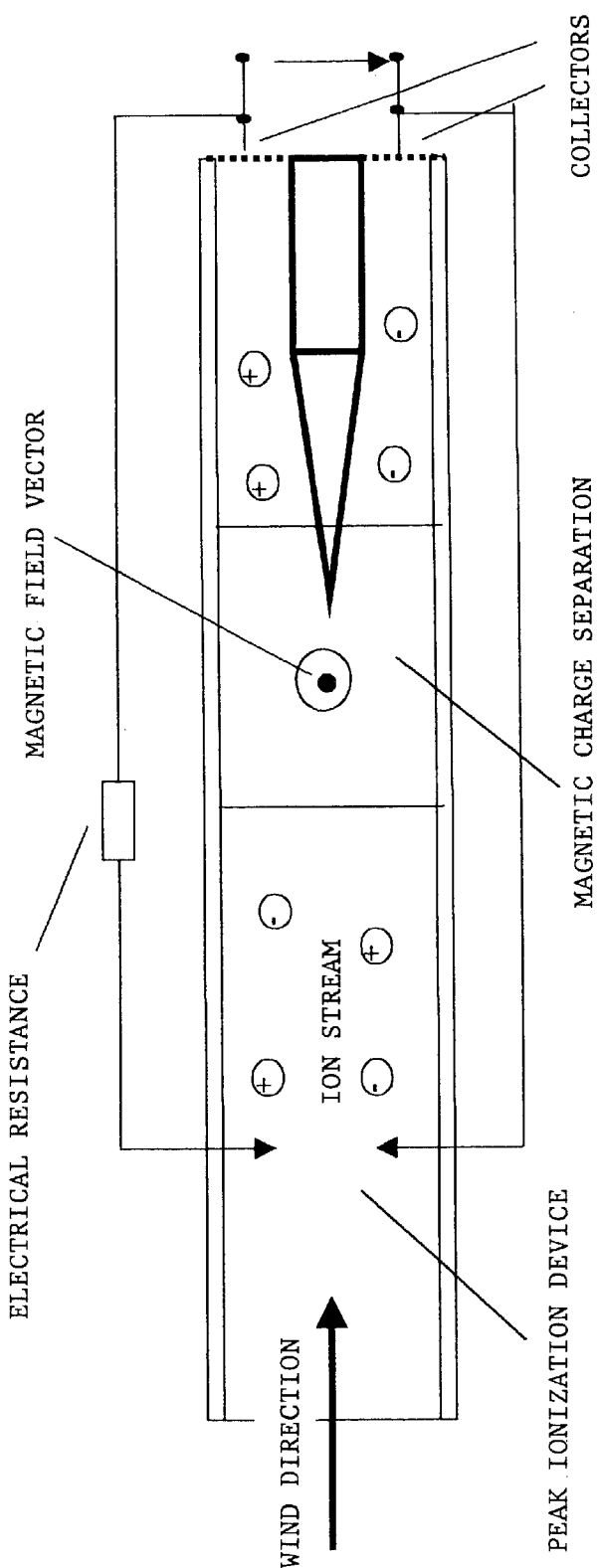
FIG. 3 is a cross-sectional view of an exemplary aeromagneto-hydrodynamic generator.

As noted previously, it is also possible to attain the stated objective using a magneto-hydrodynamic concept. As shown in FIG. 3, an ionization device (for example a peak ionization device) is positioned within a flat channel through which wind flows, and may be continuously operated (direct current) or periodically switched on and off, so that an intermittent ion stream is produced, and is driven by the wind. Immediately behind the ion stream generating device is a magnetic device that steers the intermittent stream into two separate channels (1, 2), which may be implemented, for example, via a magnetic field of a permanent magnet, oriented perpendicular to the ion stream device. At the end of the two channels are collectors, which are designed as close-meshed networks or as metal-coated channel surfaces. An alternating voltage generated between these collectors drives a voltage to a connected consumer. A number of elements are connected in series, in parallel, or in combination. These embodiments are also manufactured using known microsystems technology.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Apparatus for supplying power to transmitting and receiving antennas of a ROSAR system that are integrated at tips of a helicopter rotor blade and operate on-line in near real time, in pulse frequency or in the cm- or mm-wavelength range, said apparatus comprising:

at least one transponder card, arranged at said tips of said rotor blade and having at least one flat channel extending therethrough; and a plurality of fluttering bands that are integrated into said at least one flat channel extending through said transponder card, whereby wind energy is converted to electrical energy.

2. The apparatus for supplying power in accordance with claim 1, wherein:

the bands have magnetic layers; and a flat coil having one or more turns is positioned opposite said bands.

3. The apparatus for supplying power in accordance with claim 2, wherein the bands are electrically connected to one another in series or parallel.

4. The apparatus for supplying power in accordance with claim 1, wherein:

said at least one transponder card is flat and streamlined in its outer shape; and height of said at least one transponder card does not exceed 10 mm.

5. The apparatus for supplying power in accordance with claim 4, wherein:

the bands have magnetic layers; and a flat coil having one or more turns is positioned opposite said bands.

* * * * *